(12) United States Patent
Nowak

(10) Patent No.: US 8,695,633 B2
(45) Date of Patent: Apr. 15, 2014

(54) CONTROL OF ROTARY VALVE OPERATION FOR REDUCING WEAR

(75) Inventor: Franz Marcus Nowak, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 329 days.

(21) Appl. No.: 12/878,149

(22) Filed: Sep. 9, 2010

(65) Prior Publication Data

US 2012/0061604 A1    Mar. 15, 2012

(51) Int. Cl.
*F16K 11/074*    (2006.01)

(52) U.S. Cl.
USPC ............ 137/625.15; 137/625.46; 251/129.04; 251/159; 251/161; 251/172; 251/192

(58) Field of Classification Search
USPC .......... 137/1, 14, 485, 487.5, 625.11, 625.15, 137/625.46; 251/129.04, 157, 158, 159, 251/160, 161, 172, 175, 187, 188, 192, 208, 251/901; 73/9, 168, 524, 862.191, 862.193, 73/862.195, 862.27
See application file for complete search history.

(56) References Cited

U.S. PATENT DOCUMENTS

| | | | |
|---|---|---|---|
| 2,957,485 A | 10/1960 | Boyd, Jr. | |
| 2,985,589 A | 5/1961 | Broughton et al. | |
| 3,040,777 A | 6/1962 | Carson et al. | |
| 3,192,954 A | 7/1965 | Gerhold et al. | |
| 3,201,491 A | 8/1965 | Stine et al. | |
| 3,291,726 A | 12/1966 | Broughton | |
| 3,732,325 A | 5/1973 | Pharis et al. | |
| 3,941,351 A * | 3/1976 | Graham | 251/161 |
| 4,141,536 A * | 2/1979 | Graham | 251/161 |
| 4,156,437 A * | 5/1979 | Chivens et al. | 137/554 |
| 4,216,798 A * | 8/1980 | Tscherner | 137/625.29 |
| 4,469,494 A * | 9/1984 | van Weenen | 96/124 |
| 4,633,904 A | 1/1987 | Schumann et al. | |
| 5,040,569 A * | 8/1991 | Nogami et al. | 137/625.65 |
| 5,187,433 A * | 2/1993 | Even | 73/862.193 |
| 5,469,737 A * | 11/1995 | Smith et al. | 73/168 |
| 5,513,536 A * | 5/1996 | Reger et al. | 73/862.191 |
| 5,524,485 A * | 6/1996 | Bernard et al. | 73/168 |
| 5,676,281 A | 10/1997 | Reier | |
| 5,881,689 A | 3/1999 | Hochholzer | |
| 5,975,487 A | 11/1999 | Eggleston | |
| 6,004,518 A | 12/1999 | Green | |
| 6,063,161 A | 5/2000 | Keefer et al. | |
| 6,138,564 A | 10/2000 | Eckardt et al. | |
| 6,155,283 A * | 12/2000 | Hansen et al. | 137/1 |
| 6,557,827 B1 * | 5/2003 | Aoki | 251/313 |
| 6,712,087 B2 | 3/2004 | Hill et al. | |
| 6,783,111 B2 * | 8/2004 | Cash et al. | 251/160 |

(Continued)

FOREIGN PATENT DOCUMENTS

WO    94/05979 A1    3/1994

*Primary Examiner* — John K Fristoe, Jr.
*Assistant Examiner* — Matthew W Jellett
(74) *Attorney, Agent, or Firm* — Mark R Willis

(57) ABSTRACT

Aspects of the invention are associated with the discovery of methods for operating rotary valves that reduce or minimize wear of the seal sheet, which is often the limiting factor in overall processing capability of the valve. The control of certain parameters associated with the rotary valve operation, and particularly the seating pressure of the seal sheet (e.g., the dome pressure), can extend the useful life of the seal sheet, thereby avoiding excessive maintenance and downtime costs. In preferred embodiments, control is on a real time basis.

19 Claims, 3 Drawing Sheets

(56) References Cited

U.S. PATENT DOCUMENTS

| | | |
|---|---|---|
| 7,089,086 B2 * | 8/2006 | Schoonover .................. 700/275 |
| 7,160,367 B2 | 1/2007 | Babicki et al. |
| 7,276,107 B2 | 10/2007 | Baksh et al. |
| 7,819,948 B2 * | 10/2010 | Wagner ........................... 95/100 |
| 7,950,294 B2 * | 5/2011 | Davidkovich et al. ..... 73/862.08 |
| 8,008,536 B2 * | 8/2011 | Winter et al. .................. 585/820 |
| 8,210,205 B2 * | 7/2012 | Michaels ................. 137/625.46 |
| 8,290,631 B2 * | 10/2012 | Sweeney et al. .............. 700/282 |
| 2007/0028971 A1 | 2/2007 | Wagner |
| 2009/0107332 A1 * | 4/2009 | Wagner ........................... 95/100 |
| 2010/0089241 A1 * | 4/2010 | Stoner et al. .................... 96/125 |
| 2011/0197769 A1 | 8/2011 | Acker et al. |
| 2012/0160344 A1 * | 6/2012 | Itafuji et al. .................. 137/485 |

* cited by examiner

CONTROL OF ROTARY VALVE OPERATION FOR REDUCING WEAR

FIELD OF THE INVENTION

The invention relates to controlling the operation of a rotary valve, and particularly to reduce or minimize wear of sealing components, such as a seal sheet between a rotor and a stator comprising a stationary track plate.

DESCRIPTION OF RELATED ART

Rotary valves are often used in separation processes. A rotary valve can include several components, such as a rotor and a seal. The seal of the rotary valve may have a lifespan of about 3-5 years, and the seal life can be significantly affected by the manner in which the valve is indexed, or incrementally rotated. Some considerations associated with rotary valve indexing are described in co-pending U.S. application Ser. No. 12/704,728.

Rotary valves are particularly applicable to processes that require simultaneous changing of locations to and from which process streams are conveyed. Most notable among such processes are adsorptive separations of liquid components that are preferentially adsorbed, relative to other components in an impure mixture, by a solid particulate adsorbent that is normally contained in a stationary adsorbent column. Movement of the adsorbent is simulated by changing of process stream input and output points. In addition to the feed or impure mixture to be purified, a desorbent, capable of displacing or desorbing the preferentially adsorbed component(s) of the impure mixture from the adsorbent, is a second major process input stream to the adsorbent column(s). Likewise, multiple process output streams are withdrawn from the column(s). Among these process output streams, the extract and raffinate streams are, respectively, significantly more and less enriched compared to the feed, in the preferentially adsorbed component relative to other feed components. By distilling the extract and raffinate streams, desorbent is easily separated from the components of the impure mixture, such that the desired component can be recovered, generally at a high purity, from the extract stream. Desorbent recovered by distillation of the extract and raffinate can be reused in the separation process.

A commercially significant example of an adsorptive separation that may be performed using a selective adsorbent in a simulated moving bed process is the separation of para-xylene from a mixture of $C_8$ aromatics that includes ortho- and meta-xylene. Several other types of simulated moving bed adsorptive separations are in use, where typically the selectively adsorbed materials have the same number of carbon atoms per molecule as the non-selectively adsorbed materials and also have very similar boiling points, such that separation on the basis relative volatility (i.e., using distillation) or other differences is not practical.

In simulated moving bed processes, a gradual and incremental movement of adsorption, desorption, and isolation zones in the column(s) of adsorbent is achieved by periodically and consecutively advancing the points of introduction of process input streams and points of withdrawal of process output streams, generally along the axial length of one or more adsorbent columns. For each advance between these relatively uniformly spaced points, the boundaries of the various zone move. The points at which the major input streams enter the adsorbent column and the major output streams are withdrawn from the column are usually separated by at least two or more potential fluid conveyance points that are not being used for either an input or an output process stream. For instance, the feed stream may enter the adsorbent column at one point and flow past seven or more potential introduction/withdrawal points (and through seven distributors/collectors) before reaching the next actual point of fluid introduction or withdrawal that is in use for a process stream (e.g., the point at which the raffinate stream is removed). The successive movement of the introduction and withdrawal points of the process streams therefore does not affect the performance of the major portion of the primary zones.

Continuous switching of the fluid flows among many different locations of an adsorbent column may be achieved through the use of a multiple-port rotary valve, regulated by a central controller. Further details on the operation of simulated moving beds of adsorbent and the preferred rotary valves are found in U.S. Pat. Nos. 2,985,589; 2,957,485; 3,040,777; 3,192,954; 3,201,491; 3,291,726; 3,732,325; 4,633,904; 6,004,518; 6,063,161; 6,712,087; 7,160,367; 7,276,107; and US 2007/0028971.

A widely-used type of rotary valve has a planar circular configuration in which a flat ported rotor rotates coaxially on a flat ported stator such that ports in the stator and rotor are aligned or blocked in a predetermined cyclic sequence, depending on how process stream flows are to be routed in any given valve position or index. Sealing between the stator and rotor typically is provided by direct contact of a flat seal sheet on the rotor face, which slides over flat surfaces of the stator face, and particularly a stationary track plate. A high degree of precision is required in the fabrication of these flat, mating surfaces to prevent leakage between them. Rigid materials such as metal, carbon, or ceramic are normally used for the sealing surfaces of the rotors and stators. However, use of the rotary valve over time eventually causes slight changes in the shapes of the surfaces, thereby compromising the seal formed between the surfaces. Maintenance of the rotary valve and particularly the replacement of the seal sheet, due to wear, results in significant costs associated with process downtime. Such maintenance ultimately limits the overall processing capacity of the valve over a given time period and consequently the profitability of the simulated moving bed process.

An ongoing objective is therefore reducing seal sheet wear and thereby maximizing the useful lifespan of the rotary valve.

SUMMARY OF THE INVENTION

Aspects of the invention are associated with the discovery of methods for operating rotary valves that reduce or minimize wear of the seal sheet, which is often the limiting factor in overall processing capability (units of feed per given time) of the valve. The control of certain parameters associated with the rotary valve operation can extend the useful life of the seal sheet, thereby avoiding excessive maintenance and downtime costs. In preferred embodiments, control is on a real time basis.

Particular embodiments of the invention are directed to methods of minimizing wear of a rotary valve, comprising controlling a seating pressure on a first side of a seal sheet in response to (as a function of) a measured breakout torque and/or a measured running torque when indexing the rotary valve. Normally, upon indexing the rotary valve, the seal sheet is rotated relative to a stationary track plate in face-to-face contact with the seal sheet at adjacent sealing surfaces. Preferably, the seal sheet is rotated by a device, such as a motor or a hydraulic cylinder that is operatively linked to a cylinder shaft, ratchet arm, and pawl, with the device being in electrical communication with an indexing controller. A preferred controller is a servo drive that can receive and amplify a command signal, as well as transmit electrical current to produce motion proportional to the command signal.

Further embodiments of the invention are therefore directed to methods of minimizing wear of a rotary valve, comprising controlling parameters based on measured quantities (e.g., historical data) that are not in real time or otherwise based on a measured quantities that are in real time, combined with quantities that are not in real time. In representative embodiments, prior to a subsequent indexing of a rotary valve (e.g., while the valve is stationary), a seating pressure on a first side of a seal sheet is controlled in response to (as a function of) a breakout torque or a running torque measured during a prior indexing of the rotary valve. This prior indexing of the rotary valve may, for example, be the immediately prior indexing of the rotary valve or a prior indexing of the rotary valve at the same rotational position as the subsequent indexing of the rotary valve.

Further embodiments of the invention are directed to methods of minimizing wear of a rotary valve, comprising inputting, to an indexing controller, a setpoint velocity of rotation or a setpoint acceleration of rotation in response to (as a function of) a measured breakout torque or a measured running torque. The measured breakout torque or measured running torque are measured during indexing the rotary valve at the time of, or prior to, inputting the setpoint velocity of rotation or the setpoint acceleration of rotation. In cases of prior measurement of the breakout torque, the measurement may be during the immediately prior indexing of the rotary valve or a prior indexing of the rotary valve at the same rotational position as the subsequent indexing of the rotary valve.

Yet further embodiments of the invention are directed to adsorptive separation processes (e.g., for the separation of para-xylene from a feed comprising a mixture of ortho-, meta-, and para-xylene) comprising continuously flowing feed and desorbent into a rotary valve and to a bed of solid adsorbent and continuously flowing, from the bed of adsorbent and out of the rotary valve, extract and raffinate. The rotary valve is advantageously operated according to any of the methods described above for minimizing wear. Therefore, in representative adsorptive separation processes, the rotary valve is operated according to a method comprising controlling a seating pressure on a first side of a seal sheet in response to a measured breakout torque and/or a measured running torque when indexing the rotary valve.

These and other aspects and embodiments associated with the present invention are apparent from the following Detailed Description.

BRIEF DESCRIPTION OF THE DRAWINGS

FIGS. 1-3 are to be understood to present an illustration of the invention and/or principles involved. The features shown in FIGS. 1-3 are not necessarily drawn to scale, and some features not essential to the understanding of the invention are not shown. As is readily apparent to one of skill in the art having knowledge of the present disclosure, various other embodiments of the invention include methods for minimizing wear of rotary valves having configurations and components determined, in part, by their specific use.

DETAILED DESCRIPTION

Figure 1:
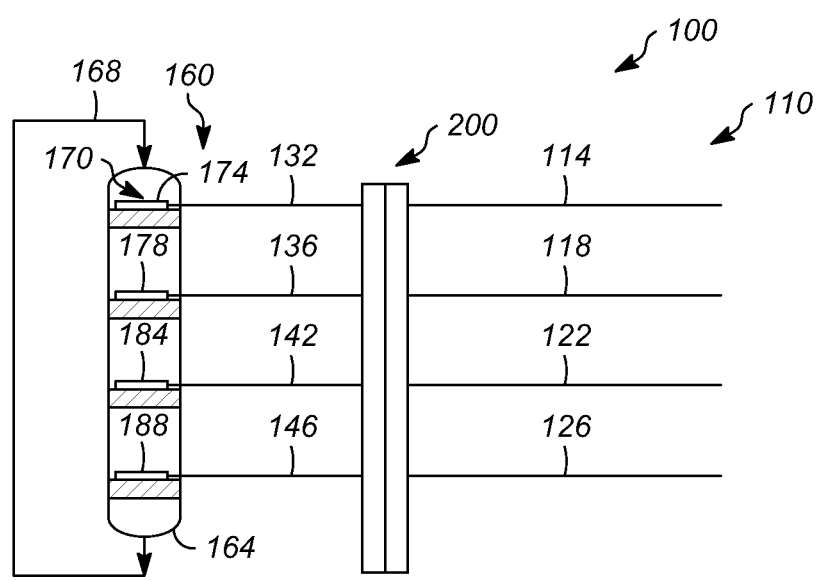
FIG. 1 is a schematic depiction of an exemplary separation system.

Representative methods for reducing wear of the rotary valve seal sheet advantageously use the breakout torque and/or the running torque as a control parameter to adjust the seating pressure. "Breakout torque" refers to the initial torque required to set the valve in motion, at the onset of indexing or rotating the valve from one index position to the next successive index position, thereby changing the ports of fluids entering and exiting the valve in a predetermined manner such that these fluids may be routed, for example to and from intermittently changing axial positions along one or more adsorbent columns (or to and from one or more adsorbent beds of the columns) as discussed above. "Running torque" refers to the ongoing torque, after the breakout torque initiates the motion required for valve indexing, needed to maintain the rotational motion of the valve and complete the indexing. Running torque is generally significantly less than the breakout torque but is required over a significantly longer time period. In representative embodiments, the breakout torque is required over an initial time period of valve indexing. Values of the breakout torque generally range from about 81,200 newton meters (Nm) (60,000 foot pounds (ft-lb)) to about 122,000 Nm (90,000 ft-lb), and values of the running torque generally range from about 54,200 newton meters (Nm) (40,000 foot pounds (ft-lb)) to about 94,900 Nm (70,000 ft-lb).

"Indexing" refers to the incremental rotation of the rotary valve required to align ports, of the entering and exiting fluids, for example to and from a stationary portion of the valve (e.g., a stator) at the next successive position with ports (e.g., of crossover piping) of a rotating portion of the valve (e.g., a rotor or rotor plate). Alignment of the stationary and rotating portions may be achieved, for example, using crossover piping on the rotating portion that places, depending on the valve index or position, a particular fluid entry or exit port in alignment with a particular track of a track plate on the stationary portion of the valve. In representative embodiments, from about 20 to about 30 possible fluid entry and exit ports may be spaced about the circumference of the rotary valve, such that indexing requires a total rotation from about 12 to about 18 degrees. These ports may, for example, be disposed about an outer perimeter of the stationary portion of the valve, while tracks of the track plate may be disposed concentrically within an inner perimeter of this stationary portion.

The "seating pressure" refers to the pressure on the rotating portion of the valve, typically the rotor plate and seal sheet, required to maintain an effective seal between mating surfaces of the rotating seal sheet and the stationary track plate of the stator, as discussed above. The seating pressure is often maintained and controlled using a pressurized fluid, or sealant fluid (e.g., process fluid such as desorbent), in an enclosed space about one side of the seal sheet, for example the first side above the seal sheet. The pressurized fluid, for example, may be admitted to and withdrawn from a dome enclosing the rotor plate and sealably bolted to the stator. In many cases, therefore, the seating pressure is also the "dome pressure" of the rotary valve. As discussed above, the seating or dome pressure on the first side of the seal sheet, according to particular embodiments of the invention, is controlled in response to (as a function of) the measured breakout torque and/or measured running torque when indexing the rotary valve. The seating pressure may therefore be controlled in real time, throughout the valve indexing, in response to one or both of these torques. According to a particular embodiment, control of the seating or dome pressure is possible using a back pressure regulating device on a sealant fluid outlet from the dome.

On the first side of the seal sheet, for example the side adjacent the rotor or rotor plate, the seating or dome pressure is often controlled using a control system that maintains at least a minimum seating pressure. The differential pressure across the seal sheet is the difference between the seating or dome pressure and the countering pressure exerted on the second side of the seal sheet, for example from the stationary track plate of the stator. The track plate is therefore typically on a second side of the seal sheet, opposite the first side on which the seating pressure is controlled. In order to ensure that a positive sealing force (generally the seating pressure minus the track plate pressure) is exhibited by the seal sheet onto the track plate, the minimum seating pressure, as a control setpoint, is typically from about 2 psig (0.14 kg/cm2) to about 20 psig (0.28 kg/cm2) above a highest track pressure of fluid in the track plate during operation. In the cases in which the rotary valve is used in adsorptive separations as described above, the highest track pressure is normally the desorbent process steam, carrying desorbent that is capable of displacing or desorbing the preferentially adsorbed component (e.g., para-xylene) of the mixture of components (e.g., mixed xylene isomers) of the impure feed stream. The control system controlling the seating pressure may also maintain, in addition to at least a minimum seating pressure, at most a maximum seating pressure. For example, the maximum seating pressure may be from about 75 psig (5.3 kg/cm2) to about 150 psig (10.5 kg/cm2) above a highest track pressure of fluid in the track plate during operation.

A "stream" or "process stream" refers to a flowing fluid, generally a liquid, comprising organic components such as hydrocarbons. Simulated moving bed adsorptive separation processes utilize one or more adsorbent columns and successive adsorbent bed zones (among which the adsorbent columns(s) is/are divided) to which, and from which, such streams may be added or withdrawn using a rotary valve. Representative processes include those for the separation of ethylbenzene or para-xylene from a mixture of $C_8$ aromatics that includes ortho- and meta-xylene; unsaturated fatty acids from saturated fatty acids; acyclic olefins from acyclic paraffins; normal or straight chained aliphatic hydrocarbons from branch chained aliphatic hydrocarbons; normal alcohols from branch chained or cyclic alcohols; straight chained aldehydes containing at least four carbon atoms per molecule from branch chained and cyclic aldehydes; straight chained ketones from branched chain ketones; straight chained aliphatic acids from branch chained or cyclic acids; and oleic acid from its branch chained isomers. A common application of adsorptive separation is the recovery of a particular class of hydrocarbons from a broad boiling point range mixture of two or more classes of hydrocarbons. An example is the separation of $C_{10}$-$C_{14}$ normal paraffins from a mixture which also contains $C_{10}$-$C_{14}$ isoparaffins. An exemplary adsorptive separation system using a rotary valve is described, for example, in U.S. Pat. No. 2,985,589. Typically, type of adsorbent chosen (e.g., an adsorbent comprising a zeolite such as zeolite X or zeolite Y) depends on the components to be separated, and particularly their molecular dimensions.

An exemplary adsorptive separation system 100 is depicted in FIG. 1. System 100 includes a plurality of lines 110 for carrying process streams, an adsorbent column 160 contained within an adsorber vessel 164, and a rotary valve 200. Rotary valve 200 is depicted schematically, without any details, merely to show its relative placement within separation system 100. As shown in FIG. 1, lines 114, 118, 122, and 126 communicate with rotary valve 200, which in turn communicates with adsorbent bed 160 through lines 132, 136, 142, and 146. Adsorbent column 160 is divided into adsorbent beds 170, for example first bed 174, second bed 178, third bed 184, and fourth bed 188. Typically, adsorbent column 160 is used in a simulated moving bed process having a line 168 carrying "pumparound" material from the bottom to the top of adsorbent column 160 to facilitate operations.

Lines 114, 118, 122, and 126 can therefore simultaneously provide a feed stream and a desorbent stream, and withdraw a product (extract) stream and a raffinate stream from rotary valve 200. Similarly, lines 132, 136, 142, and 146 can simultaneously provide the feed and the desorbent streams to particular beds 170 of adsorbent column 160 and withdraw the product and raffinate streams from particular beds 170. The particular beds 170 to which, and from which, the various process streams are provided and withdrawn depend on the position (or index) of rotary valve 200. Although four actual lines 132, 136, 142, and 146 are illustrated for conveying process streams to and from the beds 170, generally a significantly greater number of potential lines, for example 20 to 30, are available between adsorbent column 160 and rotary valve 200, for providing and withdrawing process streams to corresponding adsorbent beds 170. Therefore, at any given index of rotary valve, streams such as feed stream, desorbent stream, extract stream, and raffinate stream in lines 114, 118, 122, and 126, may be conveyed to and from any four of the greater number of possible adsorbent beds 170. Furthermore, additional process streams may be provided to or withdrawn from rotary valve, requiring more lines than lines 114, 118, 122, and 126, illustrated in FIG. 1.

Figure 2:
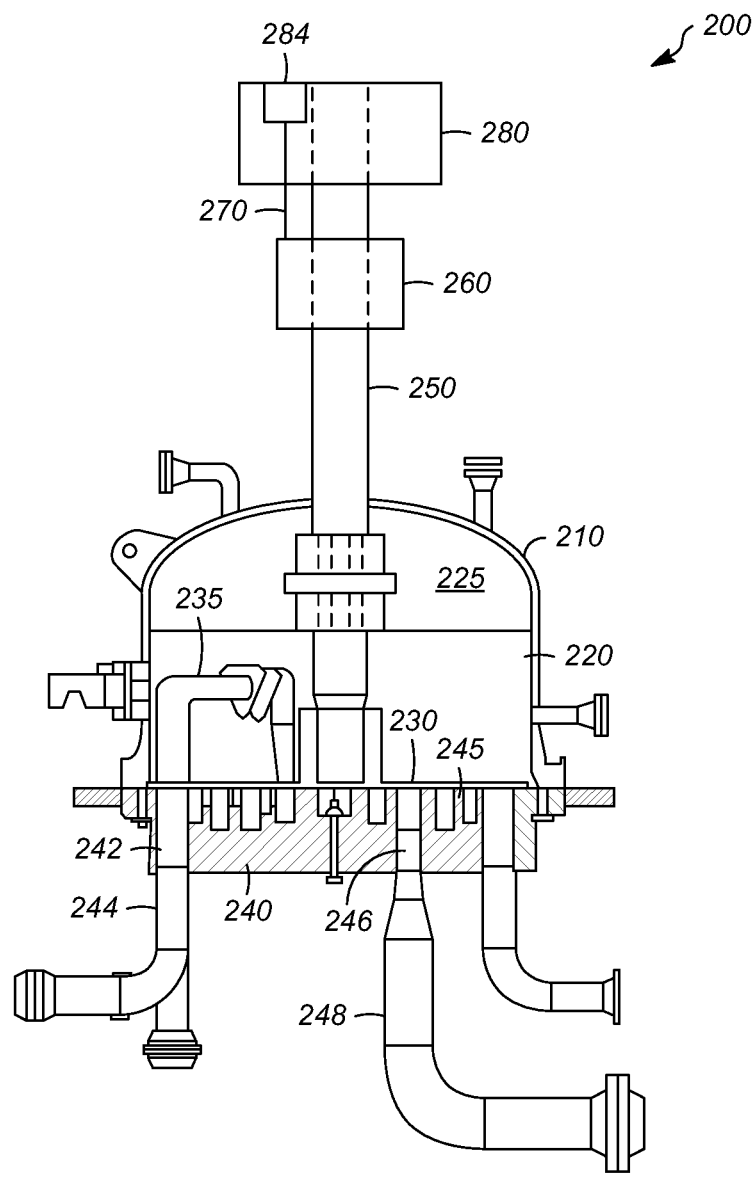
FIG. 2 is a cross-sectional view of a rotary valve with a portion of a shaft depicted in phantom.

FIG. 2 depicts an exemplary rotary valve 200 in further detail. Rotary valve 200 can include casing or dome 210 sealably enclosing rotor 220 and seal sheet 230, both of which rotate a fraction of a revolution upon indexing rotary valve 200. In contrast, stator 240 comprises stationary track plate 245 in face-to-face contact with seal sheet 230, creating a seal between mating surfaces of these components. Rotor 220, seal sheet 230, and stator 240 may all have a circular geometry with a common central axis. Crossover piping 235 of rotor 220 is used for conveying fluids from any of a multitude of fluid ports on periphery of stator 240, depending on the index or position of rotary valve 200, to each of several tracks of track plate 245. Using fluid ports and tracks (in track plate 245) of stator 240, in combination with crossover piping 235 of rotor 200, fluid can flow to and from the rotary valve 200 via, for example, lines 244 and 248 communicating with, respectively, a first and second ports 242, 246. Crossover piping 235 of rotor 220 can therefore form a series of different passageways for fluid flow paths passing through the rotary valve 200, at different positions of rotor 220. Although two ports 242, 246 are depicted, additional ports may be present depending on the number of fluids being conveyed to and from adsorbent column 160. Thus, rotor 220 and stator 240 can cooperate to form a plurality of slots, openings, or passageways communicating with a plurality of ports 242, 246. Particularly, the plurality of ports 242, 246 are spaced such that the angular rotation of the rotor 220 can align different combinations of inlet(s) and outlet(s) to and from rotary valve 200, thereby allowing the exchange of different fluids between rotary valve 200 and adsorbent column 160. Exemplary rotary valves depicting the passages through a rotor are disclosed in, e.g., U.S. Pat. Nos. 3,040,777 and 4,633,904.

Representative rotary valve 200 also includes drive shaft 250, indexing controller 260, communication link 270, motor 280, and sensor 284. Drive shaft 250 serves to rotate both rotor 220 and seal sheet 230, which may be the seating surface, for example the bottom surface, of immediately adjacent rotor 220. Seal sheet 230 is therefore in a sealing relationship with a substantially flat seating surface on the top of stator 240. The nomenclature "top" and "bottom," referring to the stator 240 and rotor 220, is used particularly with respect to the embodiment shown in FIG. 2 and is not meant to limit the invention. Rotor 220, which may be in the form of a disc, is fixed to drive shaft 250, having a common central axis. Motor 280 is capable of rotating drive shaft 250, and thereby rotor 220 in increments of generally from about 12° to about 18°, as required to index rotary valve 200. Incremental rotation may be achieved by hydraulic, electrical, or electromechanical devices.

Generally, indexing controller 260 can be any suitable controller, but preferably is a servo drive. Advantageously, a servo drive can receive a command signal from a control system, amplify the signal and transmit electrical current in order to produce motion proportional to the command signal. Representative command signals received by the indexing controller 260, according to methods described herein, include the measured breakout torque and/or measured running torque, or otherwise command signals can include setpoint parameters calculated or determined from, or in response to (as a function of), these measured quantities. Setpoint parameters include a setpoint velocity of rotation, and/or a setpoint acceleration of rotation. According to embodiments in which rotary valve parameters are controlled in real time, one or more command signals (e.g., breakout torque and running torque) are received continuously throughout indexing of the valve, and from these measured quantities, one or more setpoint parameters (e.g., seating pressure) are continuously determined or calculated. The use of measured breakout torque or measured running torque, as a basis for determining setpoint parameters for the indexing controller, includes the use of a measured deviation between a setpoint breakout torque and a measured breakout torque or a measured deviation of a setpoint running torque and a measured running torque.

The setpoint breakout and/or running torque may, for example, be determined from historical data obtained from the rotary valve operation, such as measured parameters obtained during the immediately preceding indexing or obtained during the preceding indexing at the same rotational index or position of the rotary valve. In any event, the control function of the indexing controller allows it to compare a setpoint parameter (e.g., setpoint velocity or acceleration) with the actually measured parameter and respond accordingly during indexing of the rotary valve.

Sensor 284, such as a velocity sensor, an acceleration sensor, or a breakout or a running torque sensor 284, attached to the motor 280 can report the actual measured value back to indexing controller 260. The indexing controller 260 can then compare the actual measured value with the command signal and adjust motor 280 accordingly. Motor 280 can therefore rotate in a manner that very closely achieves the performance dictated by the command signal. Several parameters of the indexing controller 260 such as stiffness, also known as proportional gain, damping, also known as derivative gain, and feedback gain, can be adjusted to achieve the desired performance. Indexing controller 260 can be preprogrammed to work with an existing control system.

Casing or dome 210 encloses space 225 about the side of seal sheet 230 and rotor 220 that is opposite the side facing stator 240. Pressurized fluid in space 225 is used to control seating pressure on seal sheet 230, and may be added through an opening in dome 210 in order to obtain an acceptable seal between seal sheet 230 and rotor 220. Other possibilities for controlling and maintaining a seating pressure include the use of springs. For example, a collar might be added to drive shaft 250 to restrain a cylindrical spring surrounding the drive shaft 250 and pressing on top of rotor 220. A plurality of springs pressing on the top of rotor 220 might be used, with the other ends of the springs being restrained by being affixed to the drive shaft 250 or to the stator 240. According to aspects of the invention as discussed above, seating pressure on a first side of seal sheet 230, namely the side facing space 225 and rotor 220, is controlled in response to a measured breakout torque and/or a measured running torque obtained when indexing rotary valve 200. The measured values, used as control parameters, are also meant to include deviations between these values and setpoint values. The associated control system for carrying out the seating pressure control scheme may, for example, use a back pressure regulator on fluid exiting space 225. According to specific embodiments, the pressure in space 225, or seating pressure, is adjusted to lower breakout and running torque during indexing of the rotary valve. Based on experimental findings, it is believed that wear of the seal sheet is particularly pronounced during breakout or the onset of movement or the rotary valve during indexing. As part of the control algorithm, the seating pressure may be maintained above minimum and maximum values to prevent, respectively, track leakage at unacceptably low pressure and damage to the seal sheet at unacceptably high pressure.

According to further embodiments, parameters other than the seating or dome pressure may be controlled, for example in real time, in response to a measured breakout and/or running torque. The other parameters, including the velocity and acceleration during indexing of the rotary valve, also have the ability to impact the rate of seal sheet wear. Therefore, according to further embodiments of the invention, the velocity and/or acceleration of the rotary valve during indexing is adjusted, in addition to the seating pressure, as a function of breakout and/or running torque. According to yet other embodiments, the seating pressure and velocity are controlled as functions of each other, along with breakout and/or running torque(s) and track pressures. Implementation of the control algorithms described herein can advantageously prolong seal sheet life through judicious control of seating pressure, velocity, acceleration, and other relevant parameters, during indexing of the rotary valve, in real time. The control algorithms may, for example, result in a velocity profile that ramps up (increases), holds, and ramps down (decreases) during indexing. At the same time, seating pressure may decrease at the onset of indexing and increase to a normal operating pressure as the rotor plate completes its movement to the next successive index or position.

The above control algorithms could also utilize historical data of torques, velocity, and acceleration obtained from the preceding indexing or obtained during the preceding indexing at the same rotational index (e.g., "feed in" position number) or position of the rotary valve. Accordingly, the seating pressure may be adjusted while the rotor plate is stationary (i.e., immediately prior to the onset of indexing), in response to measured velocity, acceleration, breakout and/or running torque(s), and/or track pressures, from a prior rotary valve indexing, in order to anticipate settings and possibly provide command signals to the indexing controller (e.g., to establish a rotor plate velocity and acceleration profile) for the upcoming indexing. Likewise, similar historical data from a defined indexing step (e.g., indexing from "feed in" position number 14 to 15) may be used as a basis for adjusting seating pressure and/or providing command signals for the same, upcoming index step.

Figure 3:
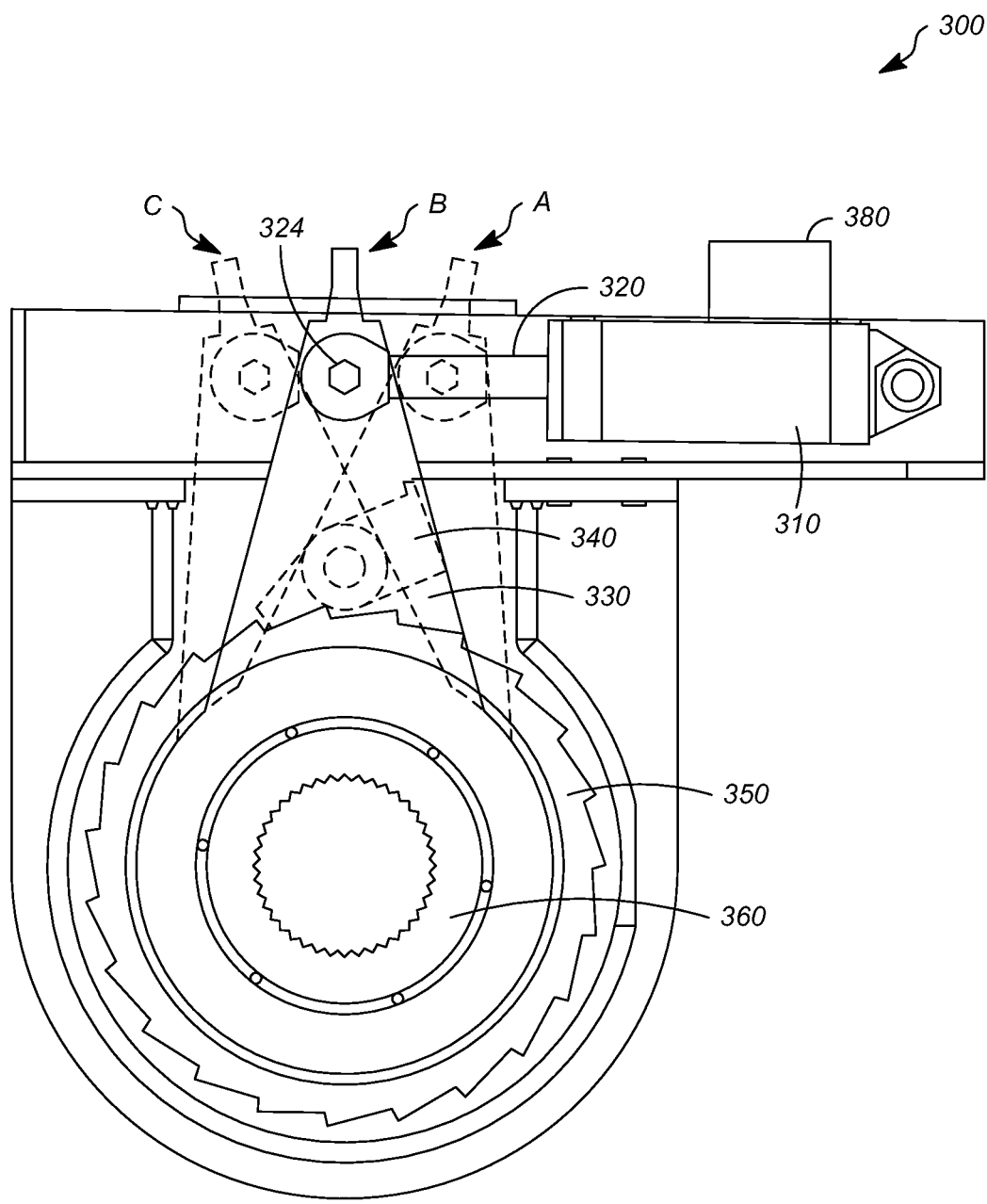
FIG. 3 is a top, plan schematic view of another rotary valve having a hydraulic cylinder, with a pawl and positions A and C of a ratchet arm depicted in phantom.

As illustrated in FIG. 3, a rotary valve 300 may include cylinder 310, ratchet arm 330, pawl 340, gear 350, cap 360, and servomotor 380 as an indexing controller. Cylinder 310 includes cylinder shaft 320 coupled to ratchet arm 330 with bolt 324. Cylinder 310, via servomotor 380, can extend and retract cylinder shaft 320 into three positions, namely a first position or fully retracted position A, a second position or middle position B, and a third position or fully extended position C. The extension and retraction of cylinder shaft 320 can index ratchet arm 330 to align various passageways formed underneath cap 360. Thus, each position A, B, and C can align different combinations of passageways and achieve the desired, successive alteration of adsorbent beds to and from which fluid flows are conveyed in a simulated moving bed adsorptive separation operation. It will be appreciated that, assuming a constant driving force is exerted during extension of cylinder shaft 320 to drive the circular motion of the rotary valve, the line of action of this driving force changes with respect to the moment arm, reaching a maximum at mid stroke and minima at the beginning and end of the stroke. However, since individual index positions generally only differ by a circumferential displacement from about 12 to about 15 degrees, the minimum torque values generated are generally about 99% of the torque achieved at mid stroke.

As the shaft 320 is extended from position A to position C, the pawl 340 can engage the gear 350 to secure the position of the cap 360. When retracting the shaft 320, the pawl 340 can disengage the gear 350 to allow retracting of the shaft 320 and rotation of the cap 360. The servomotor 380 can include the function of an indexing controller, as discussed above, and can be used, in combination with measured breakout and/or running torques and/or seating pressure, to provide feedback with respect to a velocity and/or acceleration of extending and retracting shaft 320. This can minimize wear to the rotor and/or seal sheet within valve 300, according to methods described herein.

Use of an electromechanical cylinder and a servo motor with adequate capacity can generate the necessary force to index a rotary valve and a position controller with defined or customary velocity and/or acceleration profiles. In addition, although in one preferred embodiment the motor 280 is an electric servomotor, it should be understood that any suitable mechanism may be used to power the motor, such as a hydraulic motor. A rotary valve utilizing a hydraulic cylinder may be modified to mount an electromechanical cylinder and a servomotor. Although the rotary valves 200 and 300 have been depicted, it should be understood that the embodiments disclosed herein can be applicable to other valves that convey a plurality of streams to and from various locations, for example, along the axial length of an adsorbent column.

Overall, aspects of the invention are directed to methods for minimizing wear of a rotary valve, and particularly the seal sheet thereof, by controlling a seating pressure on a first side of the seal sheet in response to a measured breakout and/or running torque. In view of the present disclosure, it will be seen that several advantages may be achieved and other advantageous results may be obtained. Those having skill in the art, with the knowledge gained from the present disclosure, will recognize that various changes could be made in the above methods without departing from the scope of the present invention. Mechanisms used to explain theoretical or observed phenomena or results, shall be interpreted as illustrative only and not limiting in any way the scope of the appended claims.

The invention claimed is:

1. A method of minimizing wear of a rotary valve including a flat ported rotor, a flat ported stator and a seal sheet positioned therebetween, with the seal sheet including a first side adjacent the flat ported rotor, and wherein the seal sheet extends across multiple ports, comprising the method comprising:

using a sensor to measure at least one of a breakout torque or a running torque wherein the breakout torque is the initial torque required to set the flat ported rotor in motion with respect to the flat ported stator and the running torque is the ongoing torque required to maintain the flat ported rotor in motion after such motion has been initiated by the breakout torque; and controlling, in real time during indexing of the rotary valve, a seating pressure on the first side of the seal sheet when indexing the rotor generally coaxially relative to the stator in response to the measured breakout torque or the measured running torque.

2. The method of claim 1, further comprising controlling the seating pressure with pressurized fluid in an enclosed space adjacent the flat ported rotor, whereby the seating pressure upon the first side of the seal sheet is transferred through the flat ported rotor to the first side of the seal sheet.

3. The method of claim 1, comprising controlling the seating pressure on the first side of the seal sheet in response to the measured breakout torque.

4. The method of claim 3, comprising controlling the seating pressure on the first side of the seal sheet in response to both the measured breakout torque and the measured running torque.

5. The method of claim 1, wherein, upon indexing the rotary valve, the seal sheet is rotated relative to a stationary track plate on the stator in face-to-face contact with the seal sheet at adjacent sealing surfaces.

6. The method of claim 5, wherein the track plate is on a second side of the seal sheet, opposite the first side on which the seating pressure is controlled.

7. The method of claim 5, wherein the seating pressure is controlled using a control system that maintains at least a minimum seating pressure.

8. The method of claim 7, wherein the minimum seating pressure is from about 2 psig (0.14 kg/cm$^2$) to about 20 psig (0.28 kg/cm$^2$) above a highest track pressure of the track plate.

9. The method of claim 5, wherein the seating pressure is controlled using a control system that maintains at most a maximum seating pressure.

10. The method of claim 9, wherein said maximum seating pressure is from about 75 psig (5.3 kg/cm$^2$) to about 150 psig (10.5 kg/cm$^2$) above a highest track pressure of the track plate.

11. The method of claim 5, wherein the seal sheet is rotated by a device in electrical communication with an indexing controller.

12. The method of claim 11, wherein the device is a motor or a cylinder.

13. The method of claim 11, wherein the seal sheet and an adjacent rotor plate are rotated by indexing the device through a drive shaft.

14. The method of claim 11, wherein the indexing controller receives a command signal that is a setpoint velocity of rotation or a setpoint acceleration of rotation.

15. The method of claim 14, wherein the command signal is in response to the measured breakout torque or the measured running torque.

16. The method of claim 15, wherein the command signal is in response to both the measured breakout torque and the measured miming torque during indexing of the rotary valve.

17. The method of claim 14, wherein a setpoint parameter selected from the group consisting of the setpoint velocity of rotation, the setpoint acceleration of rotation, the setpoint seating pressure, and combinations thereof, is in response to a deviation between a setpoint breakout torque and a measured breakout torque, a deviation between a setpoint running torque and a measured running torque, or both.

18. A method of minimizing wear of a rotary valve including a flat ported rotor, a flat ported stator and a seal sheet positioned therebetween, with the seal sheet including a first side adjacent the flat ported rotor, and wherein the seal sheet extends across multiple ports, the method comprising:

indexing of the flat ported rotor coaxially relative to the flat ported stator;

using a sensor to measure at least one of a breakout torque or a running torque wherein the breakout torque is the initial torque required, during indexing, to set the flat ported rotor in motion with respect to the flat ported stator and the running torque is the ongoing torque required, during indexing, to maintain the flat ported rotor in motion after such motion has been initiated by the breakout torque; and controlling, prior to a subsequent indexing of the flat ported rotor coaxially relative to the flat ported stator of the rotary valve, a seating pressure on the first side of the seal sheet in response the measured breakout torque of the prior indexing or the running torque measured during the prior indexing.

19. The method of claim 18, wherein the rotary valve rotates 360 degrees about an axis and the prior indexing of the rotary valve is the immediately prior indexing of the rotary valve or a prior indexing of the rotary valve at the same rotational position along the 360 degree rotation as the subsequent indexing of the rotary valve.

\* \* \* \* \*